United States Patent Office 3,511,862
Patented May 12, 1970

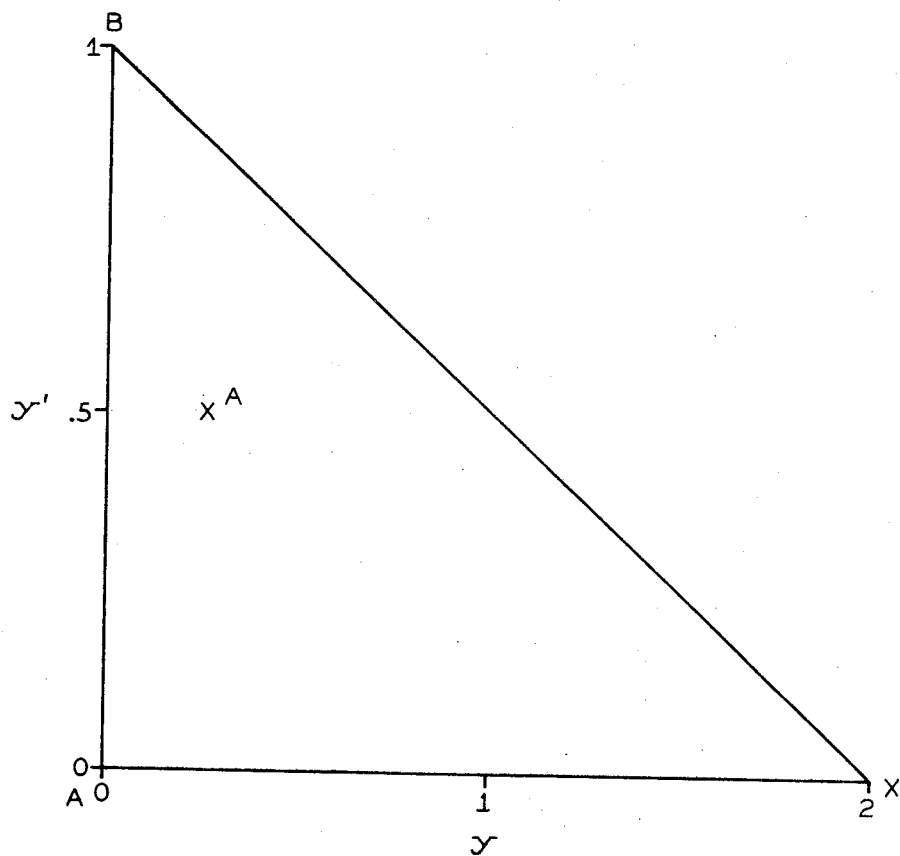

3,511,862
POLYMERIC GERMANOSILTHIANES
Kurt Moedritzer, Webster Groves, Mo., assignor to
Monsanto Company, St. Louis, Mo., a corporation
of Delaware
Filed Mar. 14, 1968, Ser. No. 713,178
Int. Cl. C07j 7/00; C07d 103/00
U.S. Cl. 260—429
22 Claims

ABSTRACT OF THE DISCLOSURE

Polymeric dihydrocarbyl germanosilthiane compositions having the general formula

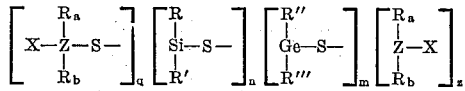

in which R, R', R'', R''', $R_a$ and $R_b$ are selected from the group consisting of hydrocarbyl radicals having from 1 to 20 carbon atoms, and phenyl and substituted phenyl radicals having from 6 to 20 carbon atoms; X is selected from the group consisting of fluorine, chlorine, bromine, alkoxyl, thioalkyl, dialkylamino, and cyano, in which the alkyl radicals have from 1 to 20 carbon atoms, Z is either silicon or germanium, and $n$ plus $m$ are numbers totaling from 1 to 100, $q$ and $z$ are equal and are whole numbers from zero to one, with the proviso that if Z=Si, then $R_a$=R, and $R_b$=R'; and if Z=Ge, then $R_a$=R'', and $R_b$=R'''. The atomic ratio Ge/Si may range from 100 to 0.01.

The products are useful as functional fluids, such as heat transfer media, lubricants and hydraulic fluids.

---

The present invention relates to novel polymeric germanium, silicon and sulfur containing compounds of the dihydrocarbyl germanosilthiane type.

According to the invention, there are provided new and valuable germanium, silicon and sulfur containing compounds having the general formula:

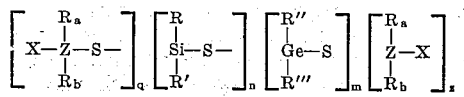

in which R, R', R'', R''', $R_a$ and $R_b$ are alike or different, and are selected from the group consisting of hydrocarbyl radicals having from 1 to 20 carbon atoms, such as alkyl and alkenyl radicals having from 1 to 20 carbon atoms, and phenyl and substituted phenyl radicals having from 6 to 20 carbon atoms; X is a halogen such as fluorine, chlorine, bromine and iodine as well as alkoxyl, thioalkyl, dialkylamino, and cyano groups in which the alkyl radicals have from 1 to 20 carbon atoms, Z is either silicon or germanium, and $n$ and $m$ are alike or different, with $n$ plus $m$ being numbers totaling from 1 to 100. The symbols $q$ and $z$ are whole numbers from zero to one (e.g., zero is considered to be a whole number), and $q$ is equal to $z$. Thus $q$ and $z$ have the value of one for the linear molecules, and zero for cyclic molecules. Furthermore, if Z=Si, then $R_a$=R, and $R_b$=R'; and if Z=Ge, then $R_a$=R'', and $R_b$=R'''. The atomic ratio Ge/Si may range from 100 to 0.01. Specific types of compounds coming under the general formula above include:

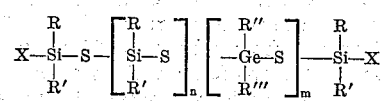

prepared by mixing and heating $RR'SiX_2$ and [RR'SiS] together with a cyclic dihydrocarbyl germanium sulfide trimmer, $[R''R'''GeS]_3$ and $R''R'''GeX_2$. Another compound coming under the general formula is

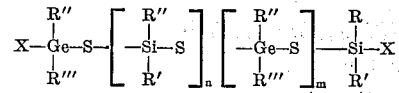

prepared by mixing and heating $RR'SiX_2$ and [RR'SiS] together with a cyclic dihydrocarbyl germanium sulfide trimer, $[R''R'''GeS]_3$ and $R''R'''GeX_2$. Still another type of compound coming under the general formula is

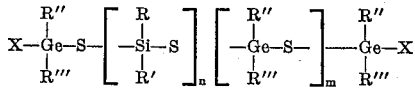

prepared by mixing and heating $RR'SiX_2$ and [RR'SiS] together with a cyclic dihydrocarbyl germanium sulfide trimer, $[R''R'''GeS]_3$ and $R''R'''GeX_2$.

In the linear chain polymeric compositions the germanium and silicon moieties are located randomly along the chain, although germanium or silicon may appear predominantly at the terminal positions of the linear polymeric compositions, depending on the terminal group X.

As examples of linear compositions under the above general formula, when $n$=0, $m$=1, $q$=$z$=1, Z=Si, and R=R'=R''=R'''=$R_a$=$R_b$=$CH_3$ the chlorine substituted product is a trimer with 1 germanium atom and 2 silicon atoms, for example

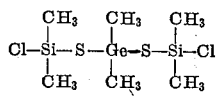

having a molecular weight of 354. Representative examples of R, R', R'', R''', $R_a$ and $R_b$ are methyl, ethyl, propyl, butyl and longer chain radicals such as decyl, dodecyl as well as the corresponding unsaturated radicals such as butenyl, cyclohexenyl, phenyl, ethylphenyl, tolyl and xylyl radicals. In germanosilthiane chains of the type described herein the distribution of silicon and germanium atoms within the various chain molecules is random. As shown by proton nuclear magnetic resonance spectra, and as confirmed by calculations, germanium or silicon atoms, depending on the substituent X, have been found to prefer to be at the ends of chains. Consequently, the polymeric compositions described herein as having either germanium or silicon preferred in the terminating groups are the predominant components of the reaction mixture.

In the linear oligomers and polymers the chains will be terminated by silicon atoms if the equilibrium Ge-end group+Si-middle group
⇌Ge-middle group+Si-end group (where end groups are XSiRR'S— or —SGeR''R'''S— moieties and middle group are —SSiRR'S— or —SGeR''R'''S— moieties) lies preferentially to the right side of the above equation. In other words, the linear chains will preferentially be terminated by silicon atoms if the equilibrium constant $$K = \frac{\text{[Ge-middle group in chains] [Si-end group]}}{\text{[Ge-end group] [Si-middle group in chains]}}$$

is larger than 1.00. For this constant being 1.00 germanium as well as silicon atoms will act as chain terminators with equal probability. If, however, K is smaller than 1.00 Ge-atoms will preferentially be terminating groups in the germanosilthianes. The following table gives for various substituents X the preferences of silicon or germanium to be in the terminating position in the chains as determined by the equilibrium constant K.

VALUE OF K FOR VARIOUS SUBSTITUENTS X

K is greater than 1

X=Cl:K=27
X=NC:K=60
X=NCS:K=3000
X=NCO:K=30,000
X=OCH$_3$:K=8
X=N(CH$_3$)$_2$:K=1×10$^{+10}$

K is about 1.0

X=Br:K=0.3
X=SCH$_3$:K=1.0

K is less than 1

X=I:K=6.10$^{-3}$

A preferred method of preparation of the novel chain type polymeric dihydrocarbyl germanosilicon sulfides utilizes a disubstitued dihydrocarbyl silane and a trimeric cyclodihydrocarbyl germanium sulfide as the starting materials. The silane material such as disubstituted dialkyl silane is employed in the mol proportion of 0.03:1 to 30:1 relative to one part of the trimeric cyclodihydrocarbyl germanium sulfide. Larger proportions of the trimeric cyclodihydrocarbyl germanium sulfide (e.g., smaller ratios, as herein defined) favor the production of higher linear polymeric products. These two components are reacted at a temperature of from 10° C. to 300° C. The linear chain type polymeric germanosilthianes which result exist as dimeric, trimeric, tetrameric, pentameric, hexameric, heptameric, octameric, nonameric, decameric and higher forms. As an example, hexaethyltrigermanium trisulfide is reacted at 200° C. with dichlorodiethyl silane to obtain linear polymers of alpha, omega dichloropolydiethyl germanosilthiane and cyclic species. As another specific example of a desirable material, alpha, omega-dichloropolydiphenyl germanosilthiane is obtained by heating and mixing together dichloro diphenyl silane with trimeric cyclodiphenyl germanium sulfide at a temperature of about 200° C.

An example showing the use of only two starting materials is the composition

Possible starting materials to provide this composition are accordingly:

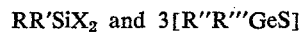

Germanosilthianes of the above type may also be prepared by mixing at least three of the four components: RR'SiX$_2$, R''R'''GeX$_2$, [RR'SiS] and [R''R'''GeS], wherein the definitions are as set forth above. Depending on the desired overall composition, i.e., the ratio of X (for example, halogen) versus the sum of Si and Ge, and the ratio of Si versus the sum of Ge and Si controlled yields of various individual polymeric compositions are obtained.

The compositions yielding oligomeric and polymeric cyclic and linear germanosilthianes are made up by reacting at least three of the four components RR'SiX$_2$, R''R'''GeX$_2$, [RR'SiS] and [R''R'''GeS] as to give an overall composition which lies within the composition diagram shown on the drawing of the present patent application.

In the drawing, y is the mole ratio X/(Si+Ge) and y' is the ratio Si/(Si+Ge). The desired compositions are located in the range wherein (y'+y)/2 is not greater than 1, and y has a value from 0 to 2, and y' has a value from 0.001 to 1.

In order further to illustrate the use of the above diagram, a specific product having composition A in the drawing has the following values: y'=0.5, and y=0.25. In order to produce such a composition having the ultimate formula

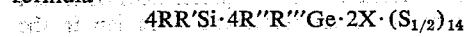

the reactants may be supplied in the following proportion by either of the two combinations of reagents.

Group 1

1RR'SiX$_2$
3[RR'SiS]
4[R''R'''GeS]

Group 2

1R''R'''GeX$_2$
3[R''R'''GeS]
4[RR'SiS]

Other compositions can similarly be prepared by controlling the proportions of the starting materials. For example, when the overall Cl/(Si+Ge) ratio is 1.00 and the Si/(Si+Ge) ratio is 0.25, a maximum yield of the trimer compound

is obtained. This yield is about 10% of the total reaction mixture, with the rest being higher polymers and cyclic molecules. Similarly, when the overall Cl/(Si+Ge) ratio in the reaction mixture is 0.75 and the Si/(Si+Ge) ratio is 0.5, about 8% of the mixture consists of the tetramer compound

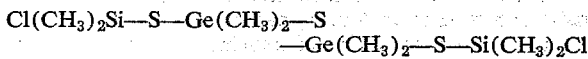

Cyclic polymeric germanosilthianes are also included in the present invention, e.g., compositions coming under the general formula but where q and z are zero, e.g., the X groups such as halogen are not present. The general formula for the group of cyclic compositions is

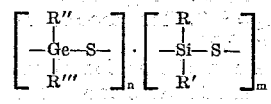

where n and m are numbers totaling from 3 to 100. These cyclic species are prepared by mixing and heating, with or without a catalyst, a dihydrocarbylgermaniumsulfide [R''R'''GeS] and a dihydrocarbylsiliconsulfide [RR'SiS] in the molar proportions expressed by n and m.

Separation of individual linear and ring-type oligomers or polymers such as those described above is carried out by distillation, low temperature column chromatography, high temperature vapor phase chromatography, etc. The individual polymeric products may thus be separated from the reaction mixture; however, the products are generally obtained as mixtures of polymers which may be used in the form of mixtures for certain industrial applications.

The dihydrocarbyl germanium sulfide starting material such as trimeric diphenyl germanium sulfide is prepared by reacting diphenyl dichlorogermane with hydrogen sulfide.

The reaction is preferably conducted in a closed vessel, although the use of relatively high boiling starting materials, e.g., a boiling point of at least 100° C. for the silane starting material, permits the use of an open vessel.

While the silane and germanium sulfide components described above react without a catalyst, it has been found that Lewis acid type catalysts provide a faster reaction to obtain the present products. For example, aluminum chloride, boron trifluoride, zinc dichloride, ferric tribromide and antimony pentachloride are representative catalysts which are useful in the present process.

The aforesaid reactants are preferably sealed into a reaction tube using an inert atmosphere such as nitrogen gas. The reaction tubes are then maintained at a temperature in the range of from 10° C. to 300° C. for a period of time of from 1 hour to 200 hours, with the higher temperatures providing a shorter reaction time. If desired a solvent such as benzene, diethyl ether, or hexane may be employed, although a solvent is not essential. The polymeric products of the present invention have good stability.

The following examples illustrate specific embodiments of the present invention.

EXAMPLE 1

The preparation of the methyl substituted polymeric germanosilthiane is shown in the present example. A pressure tube is charged with 1.3 moles of dimethyl dichlorosilane, 1,3 moles of dimethylchlorogermane and 0.86 mole of hexamethyltrigermanium trisulfide. The above reactants when plotted on the diagram correspond to $y=0.67$, and $y'=0.67$. The tube containing this mixture is sealed under nitrogen, and is then heated in a tube furnace at 120° C. The progress of the reaction is followed by withdrawing a tube from the furnace from time to time and measuring the presence of the desired polymeric reaction products by proton nuclear magnetic resonance. The trimeric molecule of the formula

appears in a yield of ca. 5%.

In order to separate the desired chain compounds up to the decameric form and higher from the reaction mixture, various separation procedures such as chromatographic adsorption and distillation are employed. Distillation is preferably carried out under vacuum conditions. For example, the trimeric compound

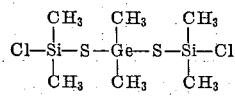

shown above has an approximate boiling point of 70° C. at 0.01 mm. pressure. Separation of the trimer from higher oligomers is readily carried out by distillation.

Identification and molecular characterization of the chain compositions is conducted by the following procedure. The trimer consisting of 1 Ge atom and 2 Si atoms gives proton nuclear magnetic resonances at $-0.94$ and $-0.75$ p.p.m. in the calculated ratio of 1:2 for methyl groups on germanium in middle groups versus methyl groups on silicon in terminal groups.

The cyclic dimeric and trimeric dimethylsilicon sulfide show single sharp proton nuclear magnetic resonance peaks at $-0.72$ and $-0.66$ p.p.m., respectively. The resonance for the dimethyl dichlorogermane is seen at $-1.167$ p.p.m. and that of the dimethyl dichlorosilane at $-0.80$ p.p.m. The reaction product of the reaction of dimethyl dichlorosilane and trimeric dimethylgermanium sulfide shows in addition to the resonances seen above, several peaks in the range $-1.12$ and $-1.08$ p.p.m. relative to internal tetramethylsilane. From the fact that these peaks form a cluster of signals lying between those of the dimethyl dichlorogermane and the dimethylgermanium sulfide, and the variation of their relative intensities with the relative proportions of the reactants, these signals are assigned to end groups in germanosilthiane chains. This is confirmed by a mathematical treatment assuming ligand exchange of chlorine and sulfur atoms on the dimethyl germanium and dimethyl silicon moiety. Additional peaks in the ranges $-1.03$ to $-0.9$ p.p.m. are attributed to various types of germanium middle groups in chains and rings. Silicon end groups are seen in the range from $-0.75$ to $-0.73$ p.p.m. Peaks in the range of 0.72 to 0.63 p.p.m. are silicon middle groups in chains or rings. The constant K is determined to be 27, clearly indicating preference of silicon atoms to be at the ends of the oligomeric and polymeric chain molecules.

The product is characterized by excellent thermal stability, being stable against thermal degradation at temperatures of 250° C.

EXAMPLE 2

Using the procedure described in Example 1, but with a different ratio of reactants, a quantity of 3 moles of dimethyldichlorosilane, 1 mole of dimethylsilthiane and 4 moles of dimethylgermthiane ($y=0.75$, and $y'=0.5$ in the diagram) are reacted at 120° C. to give a reaction product consisting of about 10% of the tetramer molecule.

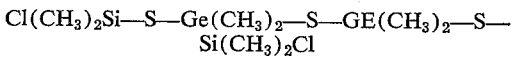

and higher molecular weight species of the formula $$Cl[(CH_3)_2Si-S]_n[Ge(CH_3)_2-S]_m-Si(CH_3)_2Cl$$

and cyclics. The various polymeric forms are soluble in hydrocarbon and chlorocarbon solvents.

EXAMPLE 3

The use of a bromine group as a substituent in the products and process of the present invention is shown by following the procedure of Example 1, using dibromo diethylsilane having the formula $Br_2Si(C_2H_5)_2$. This reagent is used with hexaethyl trigermanium trisulfide as the germanium sulfur component in the ratio of 1.3 mol of hexaethyl trigermanium trisulfide, and 0.5 mole of dibromo diethylsilane ($y=0.22$ and $y'=0.11$ in the diagram). The products are similar to Example 1 above, e.g., amount of tetramer obtained as a colorless liquid is about 5 mole percent of the polymeric products. The linear products also include higher polymeric forms such as the pentamer, hexamer, octamer, etc., e.g., $$Br-[Ge(C_2H_5)_2-S]_n[Si(C_2H_5)_2S]_m-Si(C_2H_5)_2Br$$

The constant K is found to be 0.3 indicating an almost statistical distribution of silicon and germanium, after which case K is approximately one.

The various polymeric forms are soluble in benzene, carbon disulfide, hydrocarbon and chlorocarbon solvents ore from touching the sides of the oven.

EXAMPLE 4

The use of phenyl groups as a substituent in the products and process of the present invention is shown by following the procedure of Example 1, using dichloro diphenyl silane having the formula $(C_6H_5)_2SiCl_2$ to obtain the ultimate product

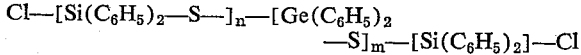

The reactant is used with hexaphenyl trigermanium trisulfide as the germanium sulfur ring reactant in the ratio of 1.3 mole of hexaphenyl trigermanium trisulfide and 0.2 mole of dichloro diphenyl silane ($y=0.1$ and $y'=0.05$ in the diagram). The reaction products include higher polymeric forms such as the pentamer, hexamer, octamer, etc., and cyclic species.

The various polymeric forms are soluble in benzene, carbon disulfide, hydrocarbon and chlorocarbon solvents such as carbon tetrachloride.

EXAMPLE 5

The use of an unsaturated group as a substituent in the products and process of the present invention is shown by following the procedure of Example 1, using diiodo divinyl silane in the presence of 1% $AlCl_3$ catalyst with cyclic $[(CH_2=CH)_2GeS]_3$. The reaction products include higher polymeric forms such as the pentamer, hexamer, octamer, etc., e.g.,

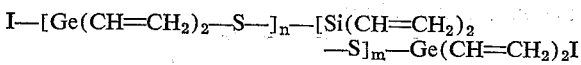

The various polymeric forms are soluble in benzene, carbon disulfide, hydrocarbon and chlorocarbon solvents such as carbon tetrachloride, and are separated by column chromatography. In the present example the major products are the dimer, trimer and tetramer of alpha, omega-diiodopolydivinyl germanosilthianes, and cyclic species. The constant K as defined above is found to be ca. $10^{-3}$ indicating that the chain molecules predominantly are terminated by germanium atoms.

The unsaturated alkyl type of the present polymeric germanosilthianes have utility as monomeric starting materials for use in the production of germanium and silicon containing polymers, and are particularly desirable for use in copolymerization with unsaturated monomers such as vinyl chloride, vinyl acetate, styrene, acrylonitrile, butadiene, etc. Silicon containing monomers may also be copolymerized with the present germanosilthianes. Other germanium or silicon containing compounds such as $RGeX_3$, for example $CH_3GeCl_3$, $C_6H_5Ge(OCH_3)_3$, $C_2H_5Si[N(CH_3)_2]_3$ and $CH_2CHSi(SC_2H_5)_3$ may also be used as cross linking agents in copolymers of the present linear polymeric germanosilthianes to give higher molecular weight copolymers.

EXAMPLE 6

The use of methoxyl groups as a substituent in the products and process of the present invention is shown by following the procedure of Example 1 using dimethoxydiethylsilane, diethylsilthiane, dimethoxydiethylgermane and hexaethyl trigermanium trisulfide as the reactants. The resulting products are similar to Example 1 above, e.g., consisting of trimers, tetramers including higher linear species such as pentamers, hexamers and octamers, e.g., $(CH_3O)[(C_2H_5)_2Si-S]_n-[-Ge(C_2H_5)_2$
$-S]_m-Si(C_2H_5)_2(OCH_3)$ The various polymeric forms are soluble in benzene, carbon disulfide, hydrocarbon and chlorocarbon solvents.

EXAMPLE 7

The use of methylthio groups as a substituent in the products of the present invention is shown by following the procedure of Example 1 using divinyldimethylthiosilane, divinyldimethylthiogermane, divinylsilthiane and divinylgermanium sulfide in several proportions as the reagents. The resulting products are similar to the ones in Example 1 above, e.g., consisting of trimers, tetramers, including higher linear species such as pentamers, hexamers and octamers, e.g., $(CH_3S)[(CH_2=CH)_2Si-S]_n-[Ge(CH$
$=CH_2)_2-S]_m-Ge(CH=CH_2)_2(SCH_3)$ The various polymeric forms or mixtures thereof are soluble in hydrocarbon and chlorocarbon solvents and in ethers.

EXAMPLE 8

Predominantly cyclic germanosilthianes are obtained when in the generalized reaction mixture as set forth above, consisting of $R''R'''GeX_2$, $[R''R'''GeS]$, $RR'SiX_2$ and $[RR'SiS]$ the concentrations of $R''R'''GeX_2$ and $RR'SiX_2$ is zero. A mixture consisting of 1 mole of hexamethylcyclotrisilthiane corresponding to the above component having the general formula $[RR'SiS]_3$ and 1 mole of hexamethylcyclotrigermthiane corresponding to the above component having the general formula $[R''R'''GeS]_3$ ($y=0$ and $y'=0.5$ in the diagram, thus coming within the broadly useful range of reactive mole proportions of from 49:1 to 1:49), when heated with a catalytic amount (0.01 mole) of aluminum chloride in a sealed tube at 150° C. yields a mixture of cyclic germanosilthianes of the general composition

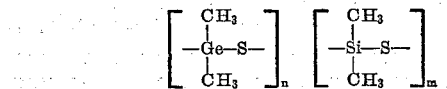

where $n$ plus $m$ is 50. Trimers ($n+m=3$) tetramers ($n+m=4$) and higher molecular weight species where $n+m$ is greater than 5 can be separated from the reaction mixture by chromatography. The NMR spectrum shows rather sharp resonances of the type attributable to ring structures.

The polymeric germanosilthianes of the present invention, particularly the trimeric and higher polymeric forms are also useful as functional fluids, e.g., as heat transfer media, lubricants, and hydraulic fluids. In this relationship the pronounced thermal stability of such compositions provides for long life of the functional fluids.

What is claimed is:

1. Germanosilthiane polymers having the general formula

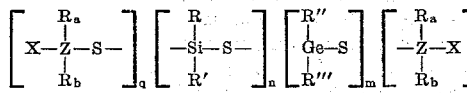

in which R, R', R", R''', $R_a$ and $R_b$ are radicals selected from the group consisting of hydrocarbyl radicals having from 1 to 20 carbon atoms, X is selected from the group consisting of fluorine, chlorine, bromine, iodine, alkoxyl thioalkyl, dialkylamino, and cyano groups in which the alkyl radicals have from 1 to 20 carbon atoms; Z is either silicon or germanium; $n$ plus $m$ are numbers 1 to 100, $q$ and $z$ are equal and are whole numbers from zero to one, with the proviso that if Z=Si, then $R_a=R$ and $R_b=R'$; and if Z=Ge, then $R_a=R''$ and $R_b=R'''$.

2. Chain germanosilthiane polymers as in claim 1 having the general formula

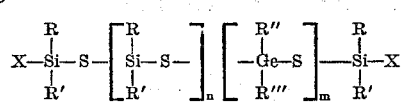

in which R, R', R" and R''' are radicals selected from the group consisting of hydrocarbyl radicals having from 1 to 20 carbon atoms, X is selected from the group consisting of fluorine, chlorine, bromine, iodine, alkoxyl, thioalkyl, dialkylamino, and cyano groups in which the alkyl radicals have from 1 to 20 carbon atoms, and $n$ plus $m$ is a number from 1 to 100.

3. Chain germanosilthiane polymers as in claim 1 having the general formula

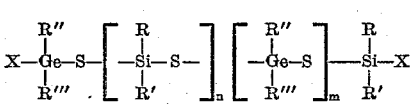

in which R, R', R" and R''' are radicals selected from the group consisting of hydrocarbyl radicals having from 1 to 20 carbon atoms, X is selected from the group consisting of fluorine, chlorine, bromine, iodine, alkoxyl, thioalkyl, dialkylamino, and cyano groups in which the alkyl radicals have from 1 to 20 carbon atoms, and $n$ plus $m$ is a number from 1 to 100.

4. Chain germanosilthiane polymers as in claim 1 having the general formula

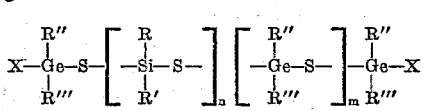

in which R, R', R" and R''' are radicals selected from the group consisting of hydrocarbyl radicals having from 1 to 20 carbon atoms, X is selected from the group consisting of fluorine, chlorine, bromine, iodine, alkoxyl, thioalkyl, dialkylamino, and cyano groups in which the alkyl radicals have from 1 to 20 carbon atoms, and $n$ plus $m$ is a number from 1 to 100.

5. The germanosilthiane polymeric composition as in claim 1 having the formula $Cl-[Si(CH_3)_2-S]_n-[Ge(CH_3)_2$
$-S]_mSi(CH_3)_2-Cl$ where $n$ plus $m$ is a whole number from 1 to 100.

6. The germanosilthiane polymeric composition as in claim 1 having the formula $$Cl(CH_3)_2Si-S-Ge(CH_3)_2-S-Si(CH_3)_2Cl$$

7. The germanosilthiane polymeric composition as in claim 1 having the formula $$Cl(CH_3)_2Si-S-Ge(CH_3)_2-$$
$$S-Ge(CH_3)_2-S-Si(CH_3)_2Cl$$

8. The germanosilthiane polymeric composition as in claim 1 having the formula $$Cl-[Si(C_6H_5)_2-S-]_n-[Ge(C_6H_5)_2-$$
$$S-]_mSi(C_6H_5)_2-Cl$$

where $n$ plus $m$ is a whole number from 1 to 100.

9. The germanosilthiane polymeric composition as in claim 1 having the formula $$CH_3O-[Si(C_2H_5)_2-S-]_n-[Ge(C_2H_5)_2-$$
$$S-]_m-Si(C_2H_5)_2-OCH_3$$

where $n$ plus $m$ is a whole number from 1 to 100.

10. The germanosilthiane polymeric composition as in claim 1 having the formula $$CH_3S-[Ge(CH=CH_2)_2-S-]_n-$$
$$[Si(CH=CH_2)_2-S-]_mGe(CH=CH_2)_2SCH_3$$

where $n$ plus $m$ is a whole number from 1 to 100.

11. The germanosilthiane polymeric composition as in claim 1 having the formula

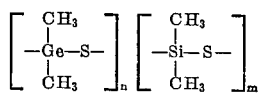

where $n$ plus $m$ is a whole number from 3 to 100.

12. The process for preparing a germanosilthiane polymer having the formula

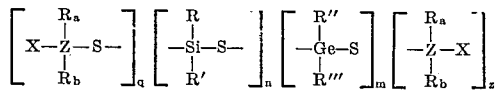

in which R, R′, R″, R‴, $R_a$ and $R_b$ are selected from the group consisting of hydrocarbyl radicals having from 1 to 20 carbon atoms; X is selected from the group consisting of fluorine, chlorine, bromine, iodine, alkoxyl, thioalkyl, dialkylamino and cyano in which the alkyl radicals have from 1 to 20 carbon atoms, Z is either silicon or germanium, and $n$ plus $m$ is a number from 1 to 100, which comprises mixing and heating together 3 of the 4 reactants $$RR'SiX_2, [RR'SiS], [R''R'''GeS], \text{ and } R''R'''GeX_2$$

where the symbols $q$ and $z$ are equal and are whole numbers from zero to one, and with proviso that if Z=Si, $R_a$=R and $R_b$=R′; and if Z=Ge, then $R_a$=R″ and $R_b$=R‴.

13. The process for preparing a chain polymeric germanosilthiane as in claim 12 having the formula

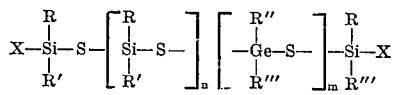

in which R, R′, R″ and R‴ are selected from the group consisting of hydrocarbyl radicals having from 1 to 20 carbon atoms; X is selected from the group consisting of fluorine, chlorine, bromine, iodine, alkoxyl, thioalkyl, dialkylamino and cyano; groups in which the alkyl radicals have from 1 to 20 carbon atoms and $n$ plus $m$ is a number from 1 to 100, which comprises mixing and heating $RR'SiX_2$ and $[RR'SiS]$ together with a cyclic dihydrocarbyl germanium sulfide trimer $[R''R'''GeS]_3$ and $R''R'''GeX_2$.

14. The process for preparing a chain polymeric germanosilthiane as in claim 12 having the formula

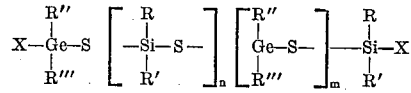

in which R, R′, R″ and R‴ are selected from the group consisting of hydrocarbyl radicals having from 1 to 20 carbon atoms; X is selected from the group consisting of fluorine, chlorine, bromine, iodine, alkoxyl, thioalkyl, dialkylamino and cyano; groups in which the alkyl radicals have from 1 to 20 carbon atoms and $n$ plus $m$ is a number from 1 to 100, which comprises mixing and heating $RR'SiX_2$ and $[RR'SiS]$ together with a cyclic dihydrocarbyl germanium sulfide trimer $[R''R'''GeS]_3$ and $R''R'''GeX_2$.

15. The process for preparing a chain polymeric germanosilthiane as in claim 12 having the formula

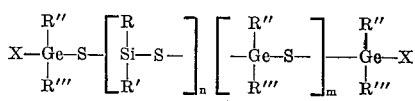

in which R, R′, R″ and R‴ are selected from the group consisting of hydrocarbyl radicals having from 1 to 20 carbon atoms; X is selected from the group consisting of fluorine, chlorine, bromine, iodine, alkoxyl, thioalkyl, dialkylamino and cyano; groups in which the alkyl radicals have from 1 to 20 carbon atoms and $n$ plus $m$ is a number from 1 to 100, which comprises mixing and heating $RR'SiX_2$ and $[RR'SiS]$ together with a cyclic dihydrocarbyl germanium sulfide trimer, $[R''R'''GeS]_3$ and $R''R'''GeX_2$.

16. The process for preparing a linear polymeric germanosilthiane as in claim 12 having the formula $$Cl[Si(CH_3)_2-S]_n-[Ge(CH_3)_2-S-]_mSi(CH_3)_2-Cl$$

where $n$ plus $m$ is a whole number from 1 to 100, which comprises mixing and heating together at least 3 of the 4 reactants $(CH_3)_2SiCl_2$ and $[(CH_3)_2SiS]$ together with $(CH_3)_2GeCl_2$ and the cyclic germanium sulfide trimer $[(CH_3)_2GeS]_3$.

17. The process for preparing a linear germanosilthiane as in claim 12 having the formula $$Cl(CH_3)_2Si-S-Ge(CH_3)_2-S-Si(CH_3)_2Cl$$

which comprises heating and mixing together $$(CH_3)_2SiCl_2$$

$(CH_3)_2GeCl_2$ and $[(CH_3)_2GeS]$ in the approximate mole proportions 1:1:2.

18. The process for preparing a linear germanosilthiane as in claim 12 having the formula $$Cl(CH_3)_2Si-S-Ge(CH_3)_2-S-$$
$$Ge(CH_3)_2-S-Si(CH_3)_2Cl$$

which comprises mixing and heating together
$$(CH_3)_2SiCl_2$$
$[(CH_3)_2GeS]$ and $[(CH_3)_2SiS]$ in the approximate mole proportions 3:4:1.

19. The process for preparing a linear polymeric germanosilthiane as in claim 12 having the formula $$Cl-[Si(C_6H_5)_2-S-]_n[-Ge(C_6H_5)_2-$$
$$S-]_mSi(C_6H_5)_2-Cl$$

where $n$ plus $m$ is 1 to 100, which comprises mixing and heating together $(C_6H_5)_2SiCl_2$, together with $$(C_6H_5)_2GeCl_2$$

and the cyclic trimer $[(C_6H_5)_2GeS]_3$.

20. The process for preparing a linear polymeric germanosilthiane as in claim 12 having the formula $$CH_3O-[Si(C_2H_5)_2-S-]_n-$$
$$[Ge(C_2H_5)_2-S-]_mSi(C_2H_5)_2-OCH_3$$

where $n$ plus $m$ is a whole number from 1 to 100, which comprises mixing and heating together at least three of the four reactants $[(C_2H_5)_2SiS]_3$, $(C_2H_5)_2Si(OCH_3)_2$, together with $(C_2H_5)_2Ge(OCH_3)_2$ and the cyclic trimer $[(C_2H_5)_2GeS]_3$.

21. The process for preparing a linear polymeric germanosilthiane as in claim 12 having the formula $CH_3S$—[Ge(CH=CH_2)_2—S—]_n—
[Si(CH=CH_2)_2—S—]_mGe(CH=CH_2)_2—SCH_3 where $n$ plus $m$ is a number from 1 to 100, which comprises mixing and heating together at least three of the four reactants $[(CH=CH_2)_2SiS]_3$, $(CH=CH_2)_2Si(SCH_3)_2$ together with $(CH=CH_2)_2Ge(SCH_3)_2$ and the cyclic trimer $[(CH_3=CH)_2GeS]_3$.

22. Process for the preparation of cyclic polymeric germanosilthianes as in claim 12 having the formula

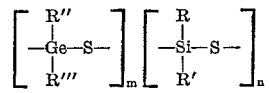

where each of $m$ and $n$ is at least 1 and $m$ plus $n$ is in the range of from 3 to 50 and in which R, R', R" and R''' are radicals selected from the group consisting of hydrocarbyl radicals having from 1 to 20 carbon atoms, which process comprises mixing and heating [R"R'''GeS] together with [RR'SiS] in the relative mole proportions of from 49:1 to 1:49.

References Cited

UNITED STATES PATENTS 3,393,215   7/1968   Moedritzer et al. _____ 260—429
3,344,161   9/1967   Moedritzer et al. ___ 260—448.8

TOBIAS E. LEVOW, Primary Examiner

A. P. DEMERS, Assistant Examiner

U.S. Cl. X.R.

252—42.7, 75; 260—2, 448.2

PO-1050
(5/69)

UNITED STATES PATENT OFFICE
CERTIFICATE OF CORRECTION

Patent No. 3,511,862      Dated May 12, 1970

Inventor(s) Kurt Moedritzer

It is certified that error appears in the above-identified patent and that said Letters Patent are hereby corrected as shown below:

Column 2, line 1, "trimmer," should be "trimer,".

Column 2, line 54, the last formula should be "XGeR"R'''S".

Column 6, line 38, "ore from touching the sides of the oven." should be "such as carbon tetrachloride.".

Column 8, line 26, "$R_n$=R" should be "$R_a$=R".

Column 9, line 64, right-hand section, the bottom "R''' " should be " R' ".

Signed and sealed this 12th day of October 1971.

(SEAL)
Attest:

EDWARD M. FLETCHER, JR.
Attesting Officer

ROBERT GOTTSCHALK
Acting Commissioner of Patents